3 Sheets—Sheet 1.
P. McAULIFFE.
Machine for Hulling, Scouring and Cleaning Coffee.
No. 208,324. Fig. 1. Patented Sept. 24, 1878.
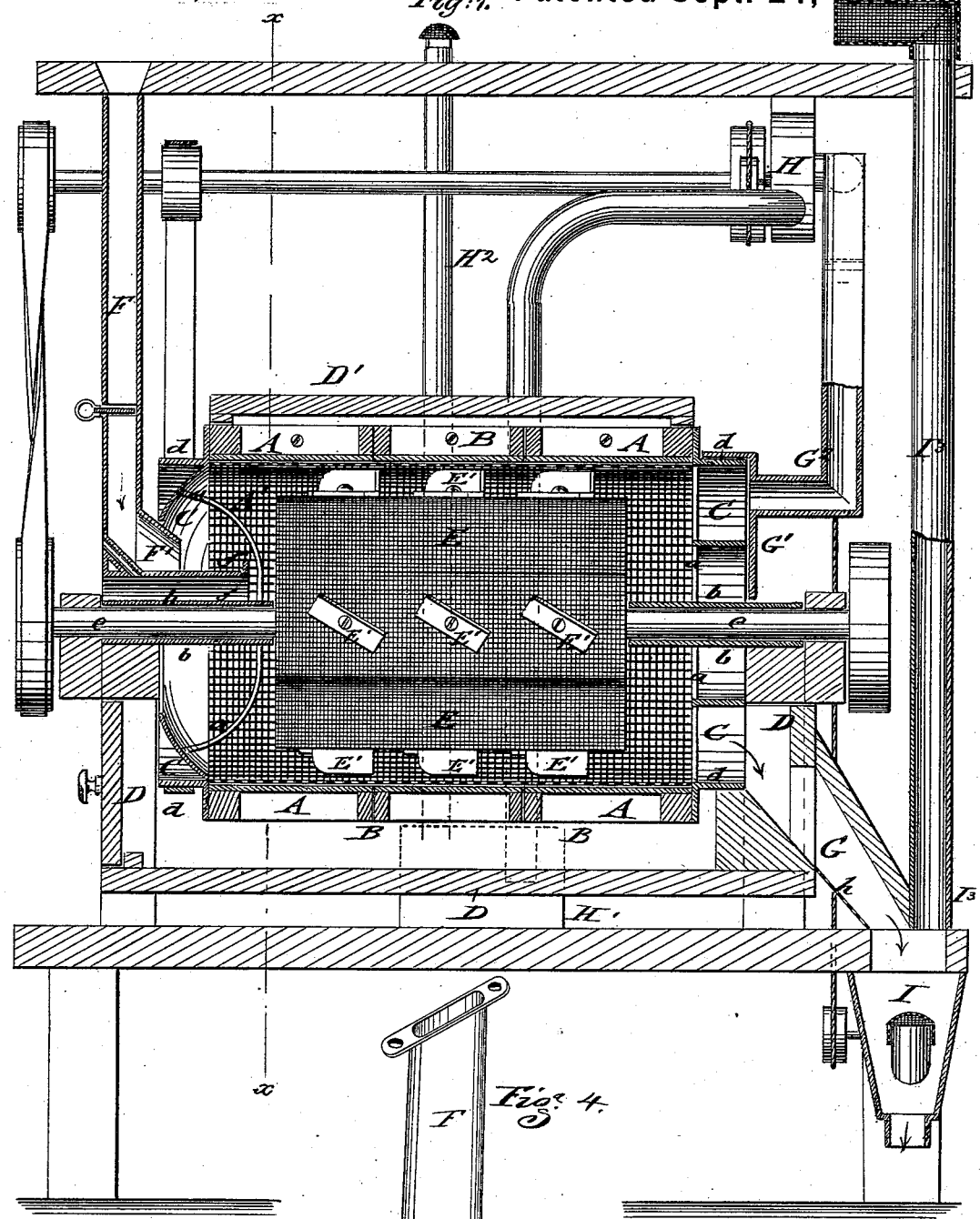
Fig. 4.
WITNESSES:
Chas. Nida
C. Sedgwick
INVENTOR:
P. McAuliffe
BY Munn & Co.
ATTORNEYS.

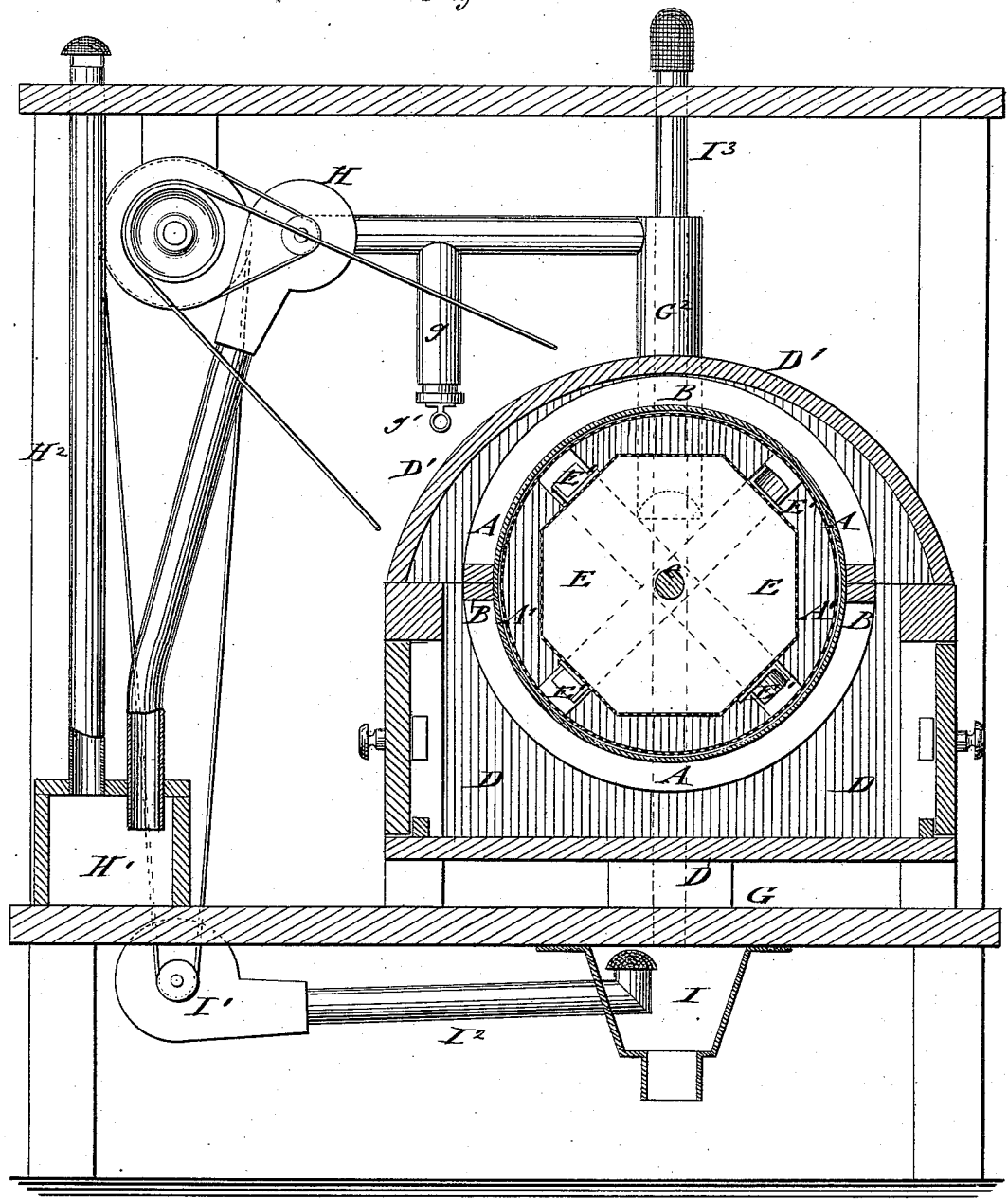

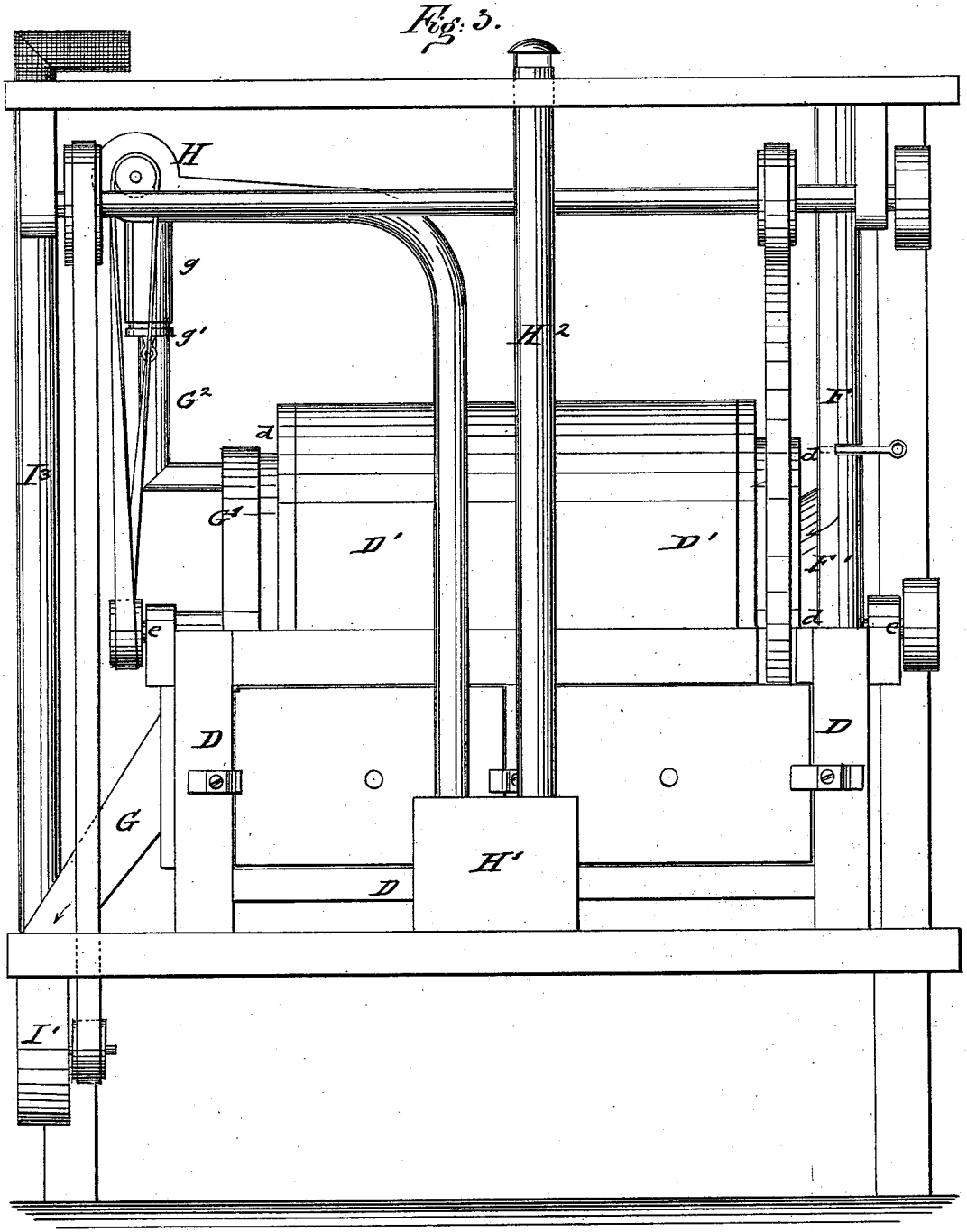

UNITED STATES PATENT OFFICE.

PATRICK McAULIFFE, OF NEW YORK, N. Y.

IMPROVEMENT IN MACHINES FOR HULLING, SCOURING, AND CLEANING COFFEE.

Specification forming part of Letters Patent No. 208,324, dated September 24, 1878; application filed July 11, 1878.

*To all whom it may concern:*

Be it known that I, PATRICK MCAULIFFE, of the city, county, and State of New York, have invented a new and Improved Machine for Hulling, Scouring, and Cleaning Coffee, of which the following is a specification:

In the accompaning drawings, Figure 1 represents a vertical longitudinal section of my improved machine for hulling, scouring, and cleaning coffee. Fig. 2 is a vertical transverse section of the same on line $xx$, Fig. 1, and Fig. 3 a rear elevation of the same. Fig. 4 is a perspective view of spout.

Similar letters of reference indicate corresponding parts.

This invention relates to an improved machine by which coffee of all grades may be hulled, scoured, and cleaned in superior manner, and different kinds and grades of coffee mixed and turned out with uniform appearance, and by which no annoyance from dust is experienced as the impurities are drawn off and collected. The machine has a continuous operation, as it receives the coffee at one end, screws it through the machine, and discharges it at the opposite end, furnishing the coffee finally in more uniform and marketable condition.

The invention will first be described in connection with the drawing, and then pointed out in the claims.

Referring to the drawings, A represents the outer main cylinder of my improved machine for hulling, scouring, and cleaning coffee, rice, and similar substances. This cylinder is constructed of one or more sheet-metal or other sections, and covered at the inner surface by a covering, A', of woven or net wire. The cylinder-sections are secured to each other by an exterior skeleton frame, B, that is screwed together, the cylinder and frame being preferably made of two semi-cylindrical sections, for being readily taken to pieces for replacing the inner wire covering when it is worn out.

To the ends of the cylinder A are secured the flanged heads C, which are connected by radial arms $a$ to the sleeve-shaped hubs $b$ of the cylinder, which hubs are supported in bearings of a box-shaped casing, D, that incloses the lower half of the cylinder. The circular flange $d$ of one of the heads C of the cylinder serves as a pulley to revolve the cylinder by belt-connection with a driving-shaft overhead.

Through the sleeve-shaped hubs of the cylinder passes the shaft $e$ of an interior angular stirrer-trunk, E, that is placed close to and equidistant from the inner surface of the cylinder and revolved in opposite direction thereto, and preferably at somewhat greater speed.

The shaft of the stirrer-trunk E turns in separate bearings of the casing D, and revolves independently and inside of the hubs of the cylinder.

The stirrer-trunk E is of less length than the cylinder, covered in similar manner with wire netting, and provided on all sides, or on every alternate side, with projecting stirrer plates or beaters E', that are secured at varying inclinations to the axis of the trunk, so as to exert a forward screw-motion on the coffee in the cylinder.

The corners of the stirrer-trunk E are close to the cylinder—about three-fourths of an inch to one and three-fourths inch from the same—while the center lines of the sides are from two to three inches therefrom. The flanged stirrer-plates come close to the inner surface of the cylinder—from one-half an inch to one and one-half inch from the same—and carry the coffee along, freeing it of the hulls, but without breaking the same.

The coffee is conducted through a vertical conductor, F, from the next story above, or from a suitable hopper, into the receiving end of the cylinder, the supply being regulated by a horizontal slide and discharge, through a spout, F', with convex bottom, that is supported on the casing and extended over the sleeve-shaped hub of the cylinder. A flange, $f$, at the outer edge of the bottom plate of the spout F', serves to conduct the coffee at both sides of the spout in uniform manner to the cylinder, so that all the beans are taken up at nearly the same point and uniformly exposed to the rubbing and scouring action of the surfaces of the cylinder and trunk.

The head of the cylinder at the receiving end next to the spout is fitted by an annular convex portion to the spout, so as to close the cylinder at that end against the escape of dust. The opposite delivery-head of the cylinder fits by its outer flange $d$ to the concave mouth of the discharge-channel G at the lower part of the casing, and to an inclosing-flange of the semicircular wall or head $G^1$, into which the suction-pipe $G^2$, for removing the lighter impurities, is secured. The inclosing-casing D of the cylinder, as well as a semicircular shell, D', extending over the top of the same, serves, in connection with the heads, to prevent the escape of dust and impurities, and to collect them in the lower part of the casing, from where they may be removed by means of detachable panels. The hulls, threads, and other light scoured-off particles are drawn off from the interior of the cylinder by means of a suction-fan, H, that is connected to the suction-pipe $G^2$, and by a downward-extending pipe to a receptacle, $H^1$, near the bottom, in which the heavier impurities are collected and from time to time removed. A downwardly-extending pipe, $g$, with removable bottom cap $g'$, is connected to the suction-pipe between cylinder and fan, so as to take up the larger and bulkier particles and prevent the clogging of the fan by the same. The suction-draft passes finally from the bottom receptacle, by a pipe, $H^2$, to the outside, the outer end of pipe $H^2$ being protected by a suitable cap or covering.

The discharge-channel G is provided with an inclined bottom screen, $h$, over which the coffee passes, so as to cause the separation of the refuse and other heavier particles. The coffee passes then into a hopper-shaped receptacle, I, where it is exposed in its passage through the same to a strong current from a blast-fan, $I^1$. The air-pipe $I^2$, which connects fan and receptacle I, is provided with a wire-gauze or other cap, which prevents the getting in of any coffee-beans into the draft-pipe. The adhering particles of skins and other light impurities are separated by the strong air-current thrown on the beans, and carried up through a vertical pipe, $I^3$, to the outside. The outer end of the pipe $I^3$ is provided with a detachable wire-gauze cap, for collecting the separated particles and admitting their removal without their being blown over the adjoining roofs and buildings. The cap may be provided with a vane and cover, so as to follow the direction of the wind and be protected against the rain. The cleaned coffee passes finally from the hopper-shaped receptacle into a receiving-bin, having been thoroughly scoured and cleaned in its passage through the machine.

The operation of the machine is as follows: The coffee to be cleaned is supplied in uniform but continuous manner from the delivery-spout, and conducted from the spout at both sides of the shaft of the stirrer-trunk to the cylinder. It is there exposed to the rubbing or frictional action of the surface of the cylinder and of the edges and sides of the stirrer-trunk, and gradually fed forward or screwed through the cylinder by the inclined stirrer-plates or beaters, so as to be thoroughly hulled and scoured during its passage through the cylinder. The so-scoured coffee is cleaned of its lighter impurities by the action of the suction-fan, that carries off the lighter particles, while the heavier impurities are screened off on its passage to the receiving-bin, and any adhering parts finally separated by the direct action of the strong air-draft on the coffee as it passes down to the receiving-receptacle. The coffee is delivered from the machine in perfectly clean state, has a uniform appearance, even if different grades or sizes have been mixed, and becomes thereby more salable. The dust and impurities are separated and conducted off without the least annoyance to the workmen or neighborhood, and, instead of the intermittingly-charged machines heretofore in use, a continuously and effectively working cleaning-machine is obtained.

Having thus fully described my invention, I claim as new and desire to secure by Letters Patent—

1. The combination, with the outer revolving cylinder, having flanged head and annular convex portion, of a delivery-spout having convex and flanged bottom to shed coffee at both sides of shaft, substantially as specified.

2. The combination of the outer revolving cylinder, having discharge-head with circumferential flange, with a fixed and flanged end wall, and with a pipe and suction-fan for drawing off the lighter impurities, substantially as specified.

PATRICK McAULIFFE.

Witnesses:
PAUL GOEPEL.
C. SEDGWICK.